United States Patent [19]
Nagamura et al.

[11] Patent Number: 5,349,822
[45] Date of Patent: Sep. 27, 1994

[54] METHOD AND APPARATUS FOR THE PRODUCTION OF ULTRA-HIGH PURITY NITROGEN

[75] Inventors: Takashi Nagamura; Takao Yamamoto, both of Hyogo, Japan

[73] Assignee: Teisan Kabushiki Kaisha, Tokyo, Japan

[21] Appl. No.: 26,481

[22] Filed: Mar. 4, 1993

[51] Int. Cl.$^5$ ................................................. F25J 3/00
[52] U.S. Cl. ............................................. 62/39; 62/41
[58] Field of Search ................................ 62/24, 39, 41

[56] References Cited

U.S. PATENT DOCUMENTS 5,006,139  4/1991  Agrawal et al. ................... 62/24
5,157,926  10/1992  Guilleminot ......................... 62/87

FOREIGN PATENT DOCUMENTS 0376465  8/1993  European Pat. Off. .

Primary Examiner—Ronald C. Capossela
Attorney, Agent, or Firm—Young & Thompson

[57] ABSTRACT

Air separation by low temperature liquefaction and fractionation wherein feed air is compressed and cooled and supplied to a single stage air separation column from which gaseous nitrogen is removed frown the top and wherein an oxygen-rich liquid is removed from the bottom. The column contains solid material providing solid surfaces on which mass and energy transfer takes place to effect fractionation over a substantial vertical height in the single stage of the column. Liquid is removed from the column intermediate that height, and the removed liquid is subcooled and expanded to produce a gas and a liquid. The liquid is an ultra-high purity nitrogen product, and can be withdrawn from the cycle in liquid or vapor phase. Vapor is removed from the top of the column, cooled and partially condensed and phase separated. Vapor from the last-mentioned phase separation is discharged, thereby to eliminate from the cycle most of the impurities boiling lower than nitrogen. Liquid from the last-mentioned phase separation is returned to the top of the column as reflux.

8 Claims, 3 Drawing Sheets

METHOD AND APPARATUS FOR THE PRODUCTION OF ULTRA-HIGH PURITY NITROGEN

FIELD OF THE INVENTION

The present invention relates to a method and an apparatus for manufacturing ultra-high purity nitrogen containing only traces of low boiling point substances such as hydrogen, helium and neon. Such ultrahigh purity nitrogen is of particular use in semi-conductor manufacturing processes and the like.

BACKGROUND OF THE INVENTION

It has heretofore been proposed to produce ultra-high purity nitrogen in an air separation cycle by separating nitrogen from air and condensing the nitrogen. Uncondensed gas is discharged and contains large quantities of low boiling point substances. The liquid nitrogen containing reduced quantities of the low boiling point substances is introduced as reflux to the top of a fractionating column, and a large part of the liquid nitrogen introduced as reflux is removed from the column from a fractionating plate located several plates below the top plate of the column.

The nitrogen product thus produced has progressively reduced quantities of low boiling point substances, the lower is the fractionating plate from which the liquid nitrogen introduced as reflux is taken. However, this technique has the disadvantage that oxygen, which of course is a somewhat higher boiling point substance, tends to remain as an impurity in the nitrogen product; and the degree of purity of the nitrogen product thus suffers.

OBJECT OF THE INVENTION

It is an object of the present invention to improve the degree of purity of ultra pure liquid nitrogen produced by the fractionation of air.

Another object of the present invention is to provide a method and an apparatus for producing ultra-high purity nitrogen, free from undesirable quantities of oxygen.

Finally, it is an object of the present invention to provide a method for producing ultra-high purity nitrogen, which will be easy and reliable to practice and an apparatus for the same purpose which will be relatively inexpensive to produce and operate and reliable in use.

SUMMARY OF THE INVENTION

The above objects of the present invention are achieved according to the present invention by providing a single stage air separation process, wherein gas from the top of the single stage is cooled so as partially to condense it and the condensate is used to reflux the single stage. The gas remaining after this cooling is discharged from the cycle as an exhaust gas containing most of the low boiling impurities, e.g. hydrogen, helium and neon.

Part of the liquid nitrogen in the single stage is removed from a fractionating plate several plates below the top plate; and this liquid is subcooled and expanded, thereby to separate almost all of the remaining low boiling point substances in the remaining gas, The liquid produced by this subcooling and expansion is the ultra-high purity liquid nitrogen product of the present invention, which can be removed from the cycle either in liquid phase or, if its refrigeration is to be recovered within the cycle, in vapor phase.

BRIEF DESCRIPTION OF THE DRAWINGS

Other objects and advantages of the present invention will become apparent from a consideration of the following description, taken in connection with the accompanying drawings, in which.

DETAILED DESCRIPTION OF THE INVENTION

Figure 1:
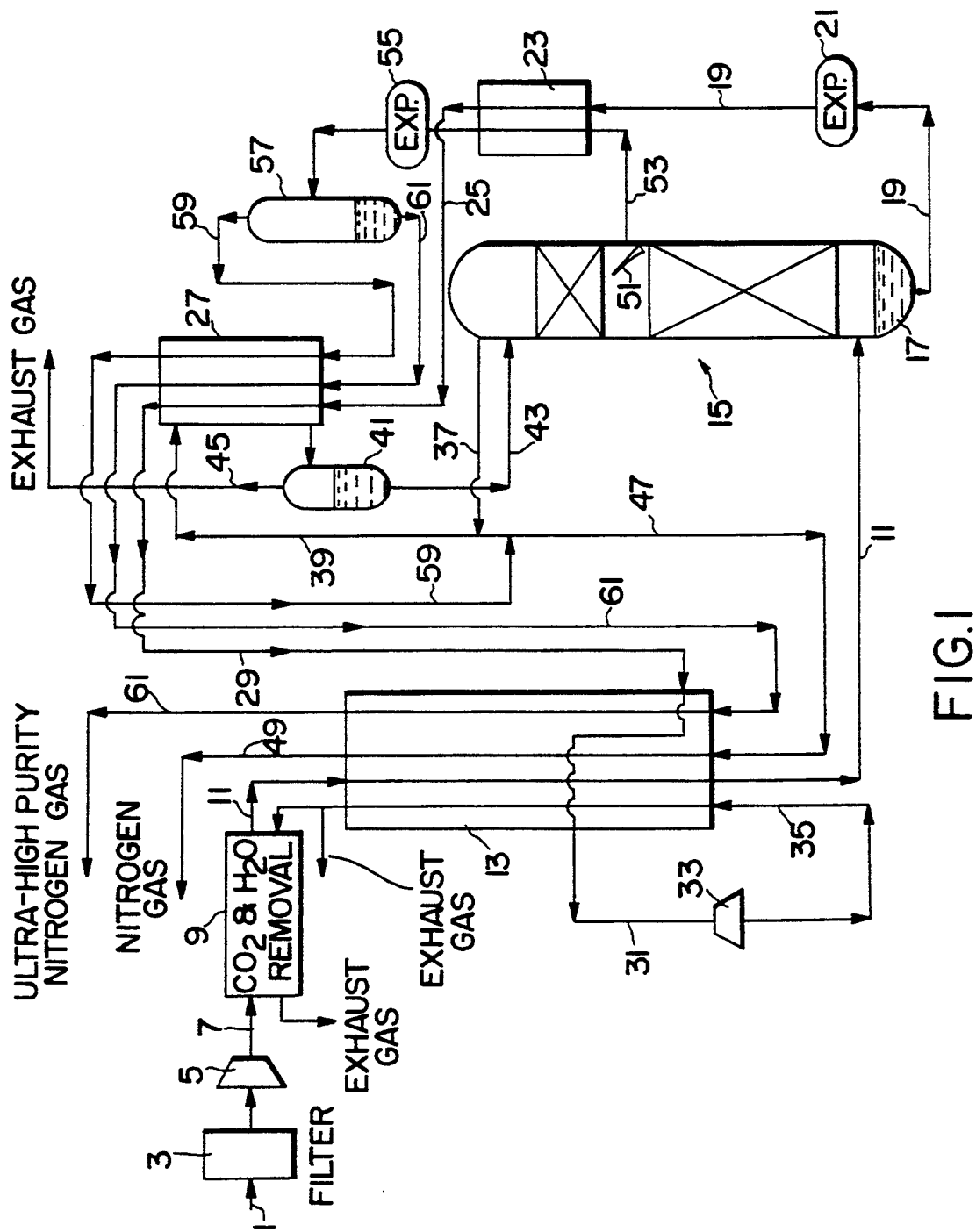
FIG. 1 is a schematic representation of a first embodiment of an air separation cycle including provision for the production of ultra-high purity nitrogen according to the present invention.

Referring now to the drawings in greater detail, and first to the embodiment shown in FIG. 1 thereof, there is shown an air separation cycle wherein air is supplied via conduit 1 and passed through a filter 3 wherein it is stripped of dust. The air typically may have a flow rate of 5,000 $Nm^3$/hour and is then compressed in a compressor 5 to a pressure of 8.7 $kg/cm^2$ gauge. The compressed air then proceeds through conduit 7 to a unit 9 wherein it is cooled and dried and carbon dioxide is removed. The air then proceeds through a conduit 11 to a main heat exchanger 13, the air entering heat exchanger 13 typically having a temperature of 20° C., a helium content of about 5,000 ppb, a hydrogen content of about 500 ppb and a neon content of about 15,000 ppb.

In main heat exchanger 13, the air is cooled to about $-166°$ C., a temperature close to its liquefaction point, and then is fed to a single stage air separation column 15.

In column 15, a liquid 17, principally oxygen, collects in the bottom, this oxygen having a helium content of about 20 ppb, a hydrogen content of about 10 ppb and a neon content of about 400 ppb. Liquid 17 from the bottom of single stage 15 is withdrawn through conduit 19 and expanded adiabatically in a Joule-Thomson expansion valve 21 to a pressure of 4.2 $kg/cm^2$ gauge, whence it proceeds through a heat exchanger 23 serving as a subcooler for another liquid stream to be described. The warmed oxygen-rich stream from subcooler 23 passes through conduit 25 to an exchanger 27 in which it loses another portion of its refrigeration in the course of being warmed to about $-172°$ C., and then passes via conduit 29 to main exchanger 13, where it is still further warmed to about $-150°$ C. and then withdrawn through a conduit 31 and expanded isentropically in an expansion engine 33 to a pressure of 0.5 $kg/cm^2$ gauge and a temperature of $-180°$ C. The stream leaving expansion engine 33 then passes via conduit 35 entirely through main exchanger 13, from which a portion is used for the regeneration of unit 9, both streams from conduit 35 then being discharged from the cycle as exhaust gas.

Returning to single stage column 15, gas from the top of the column, mostly nitrogen, is withdrawn at 37 at a flow rate of about 5,500 $Nm^3$/hour and proceeds through conduit 39 to the warm end of exchanger 27, in which it is cooled and partially condensed. The mixed stream of vapor and liquid thus produced is introduced into a phase separator 41. Liquid from phase separator 41, which is almost entirely nitrogen, is withdrawn through conduit 43 at a flow rate of 5,499 Nm$^3$/hour and contains about 200,000 volume ppb of low boiling impurities and is introduced into the top of column 15 as reflux.

The vapor overhead from separator 41 is withdrawn through conduit 45 and discharged from the cycle as an exhaust gas, at a flow rate of 1 Nm$^3$/hour and containing 1,000,000 to 20,000,000 ppb of low boiling impurities, that is, about 0.1–2.0 volume percent. Most of the low boiling impurities are thus discharged from the cycle at this point.

Another portion of the gas withdrawn from the top of the single stage column 15 is withdrawn through conduit 47 and used to cool main exchanger 13, which it leaves via conduit 49 as a nitrogen gas product, which is, however, not the ultra-high purity nitrogen gas product of the invention.

Meanwhile, back at column 15, a liquid product is collected on a shelf 51 in an upper portion of the column but spaced a few plates below the top of the column. It should be noted that when we speak of "plates" in the present application, we are using a generic designation of solid surfaces of extended area useful for mass and energy transfer in a fractionation column. Such surfaces can be provided by conventional horizontal plates with bubble caps thereon; or they can be provided by other fillers for the column, of which many examples of suitable packing are well known to those in the art. Thus, the present invention is not limited to the use of plates as such in the column 15.

Liquid nitrogen collecting on the shelf 51 is withdrawn at a flow rate of 1,800 Nm$^3$/hour and has a content of about 350 volume ppb of the above-mentioned low boiling impurities. It is subcooled in exchanger 23, in heat exchange with the liquid 17 previously described and is expanded adiabatically through a Joule-Thomson expansion valve 55, in which a portion is vaporized. This stream, with a pressure of 0.5 kg/cm$^2$ gauge, is then introduced into phase separator 57, from which the uncondensed vapor is withdrawn via conduit 59, with a total of about 3,000 volume ppb of low boiling impurities and a flow rate of about 100 Nm$^3$/hour. This vapor then surrenders its refrigeration to exchanger 27 and is introduced into conduit 47, whence it gives up its remaining refrigeration to exchanger 13 and leaves via conduit 49 as a portion of a nitrogen gas product previously described.

The liquid collecting in phase separator 57, now stripped of almost all its low boiling impurities, leaves via conduit 61 at a flow rate of 1,700 Nm$^3$/hour, containing a total of about 10 volume ppb of low boiling impurities, which includes a total of 0.3 volume ppb of helium plus hydrogen. This liquid helps cool exchanger 27 and then leaves the cycle via main exchanger 13, as the ultra-high purity nitrogen product of the invention, in vapor phase, although as indicated previously it could instead be withdrawn in liquid phase.

Figure 2:
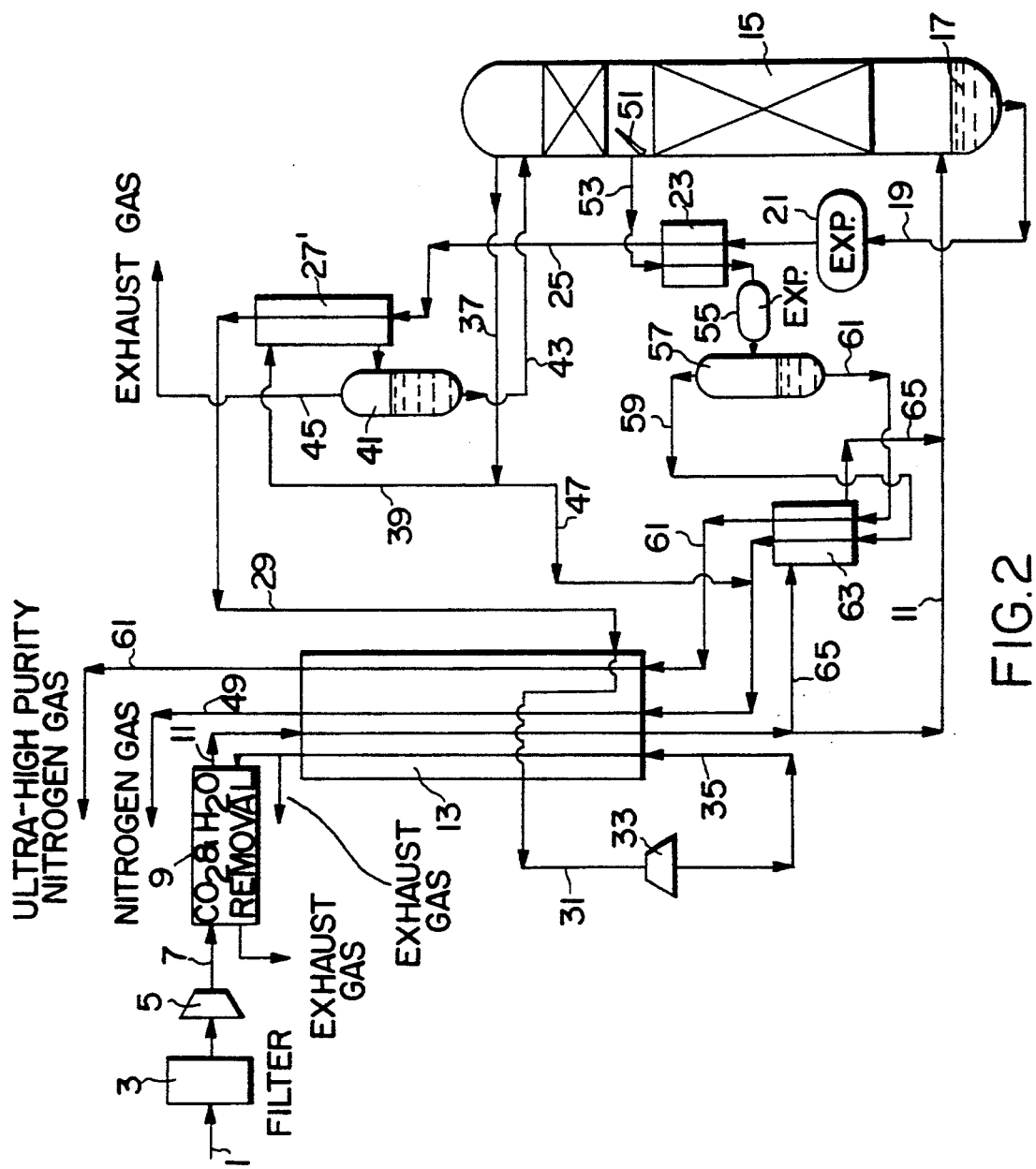
FIG. 2 is a view similar to FIG. 1 but showing a second embodiment thereof.

Turning now to FIG. 2 of the drawings, there is shown a modified embodiment wherein a portion of the available refrigeration is shifted to the incoming air stream. Thus, in FIG. 2, it will be noted that the exchanger 27', corresponding to the exchanger 27 of FIG. 1, is no longer cooled by the products of phase separator 57 but now only by the oxygen-rich stream in conduit 19.

Instead, the refrigeration from the products of phase separator 57 is applied directly to the incoming air; and for this purpose, an exchanger 63 is provided which serves to cool a stream of incoming air in a branch conduit 65, with a flow rate of about 3,000 Nm$^3$/hour, to a temperature of $-167°$ C., the stream in conduit 65 then joining the stream in conduit 11 on the way to column 15. The streams in conduits 59 and 61, constituting a nitrogen product and the ultra-high purity nitrogen product of the present invention, respectively, cool the exchanger 63.

Figure 3:
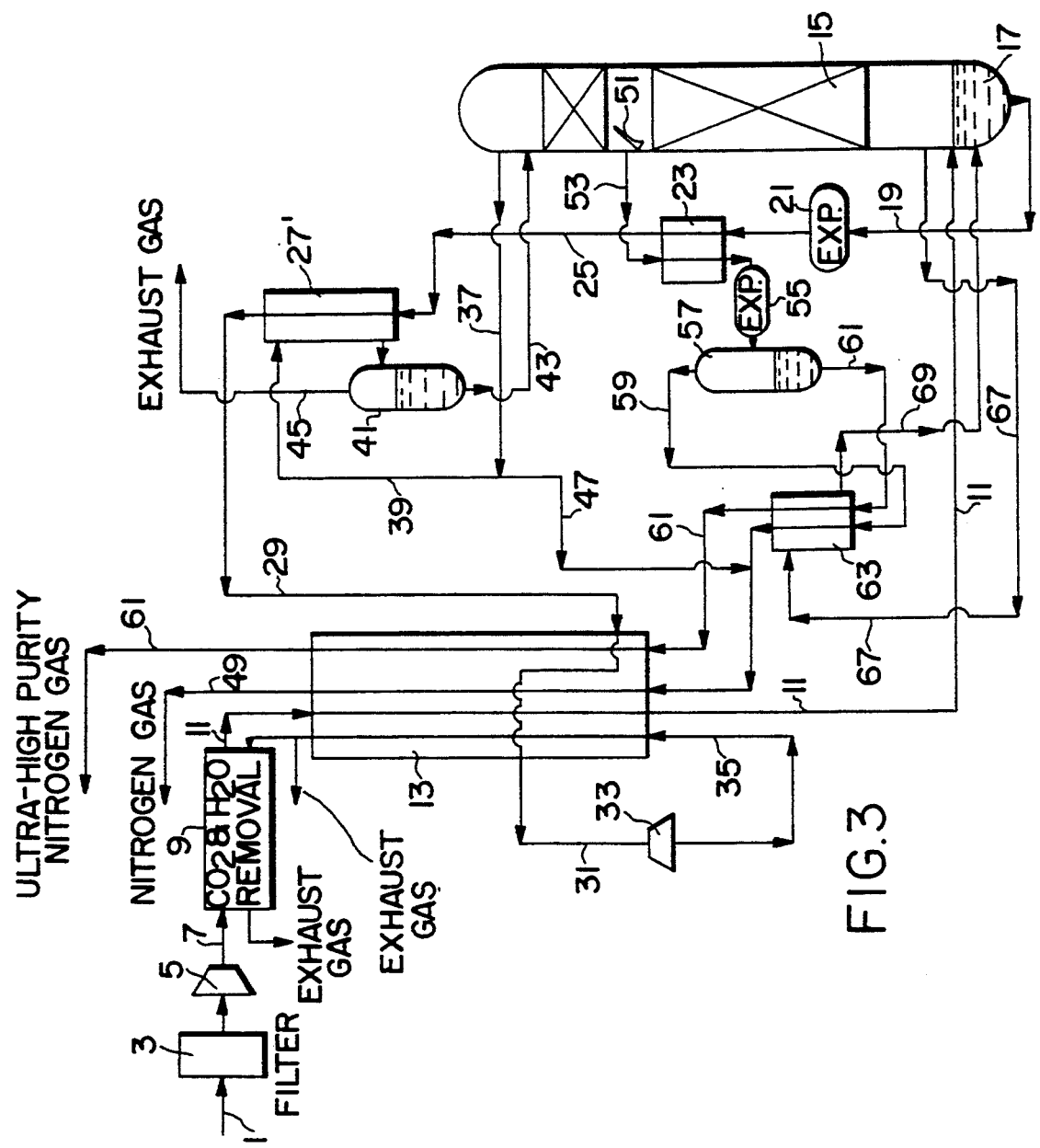
FIG. 3 is a view similar to FIGS. 1 and 2 but showing a third embodiment thereof.

Turning finally to FIG. 3 of the drawings, we see still another modified embodiment, in which the refrigeration of the streams from phase separator 57 is applied more directly to the material in the bottom of column 15. Thus, in the embodiment of FIG. 3, a gaseous oxygen-rich material is withdrawn from above liquid 17, in a conduit 67, which is then cooled and condensed in exchanger 63 in heat exchange with the liquid and vapor streams from separator 57, and then returned via conduit 69 as a liquid feed product.

In a modification of each of the above cycles (not shown), it is possible to reduce the amount of hydrogen with which the cycle must deal, by providing, in place of the unit 9, a pair of units is series. The first of these series units can be a converter filled with an oxidation reaction catalyst such as platinum or palladium, to oxidize carbon monoxide and hydrogen in the feed air. The second unit which is next encountered is a cooling, carbon removing, drying and hydrogen occluding unit wherein the air is cooled and stripped of carbon dioxide gas and moisture, and unreacted hydrogen is occluded which has not been removed in the preceding unit.

According to this last modification, the quantities of helium and neon dealt with above remain unchanged, but the hydrogen entering the system is reduced, from about 500 ppb in the previously-described embodiments, to about 1 ppb. As a result, the liquid 17 at the bottom of the column 15 will contain substantially no hydrogen and the total of low boiling point substances removed from shelf 51 through conduit 53, instead of 350 ppb, will be about 330 ppb.

The ultra-high purity liquid nitrogen product, instead of containing a total of 0.3 ppb helium plus hydrogen as in the preceding embodiments, will now contain about 0.05 ppb helium and about 0 hydrogen.

In view of the foregoing, therefore, it will be seen that all of the initially recited objects of the invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a method for separating air by low temperature liquefaction and fractionation wherein feed air is compressed and cooled and supplied to a single stage air separation column from which gaseous nitrogen is removed from the top and wherein an oxygen-rich liquid is removed from the bottom, said column containing solid material providing solid surfaces on which mass and energy transfer takes place to effect fractionation over a substantial vertical height in the single stage of the column; the improvement comprising removing liquid from said column intermediate said height, subcooling said removed liquid, expanding said subcooled liquid to produce a gas and a liquid, and withdrawing the last-named liquid as ultra-high purity nitrogen.

2. A method as claimed in claim 1, and removing vapor from the top of said single stage column, cooling and partially condensing said vapor, phase separating the partially condensed vapor, discharging vapor from the last-mentioned phase separation thereby to eliminate from the cycle most of the impurities boiling lower than nitrogen, and returning liquid from the last-mentioned phase separation to the top of the column as reflux.

3. A method as claimed in claim 1, and recovering refrigeration from both the vapor and the liquid produced by said phase separation, by indirect heat exchange with incoming air.

4. A method as claimed in claim 1, and effecting said subcooling by withdrawing liquid from the bottom of said single stage column and expanding the same and then indirectly heat exchanging the same with said liquid withdrawn intermediate said height.

5. In apparatus for separating air by low temperature liquefaction and fractionation wherein feed air is compressed and cooled and supplied to a single stage air separation column from which gaseous nitrogen is removed from the top and wherein an oxygen-rich liquid is removed from the bottom, said column containing solid material providing solid surfaces on which mass and energy transfer takes place to effect fractionation over a substantial vertical height in the single stage of the column; the improvement comprising means for removing liquid from said column intermediate said height, means for subcooling said removed liquid, means for expanding said subcooled liquid to produce a gas and a liquid, and means for withdrawing the last-named liquid as ultra-high purity nitrogen.

6. Apparatus as claimed in claim 5, and means for removing vapor from the top of said single stage column, means for cooling and partially condensing said vapor, means for phase separating the partially condensed vapor, means for discharging vapor from the last-mentioned phase separation thereby to eliminate from the cycle most of the impurities boiling lower than nitrogen, and means for returning liquid from the last-mentioned phase separation to the top of the column as reflux.

7. Apparatus as claimed in claim 5, and means for recovering refrigeration from both the vapor and the liquid produced by said phase separation, by indirect heat exchange with incoming air.

8. Apparatus as claimed in claim 5, and means for effecting said subcooling by withdrawing liquid from the bottom of said single stage column and expanding the same and then indirectly heat exchanging the same with said liquid withdrawn intermediate said height.

* * * * *